(12) United States Patent
Clark et al.

(10) Patent No.: US 9,776,298 B2
(45) Date of Patent: Oct. 3, 2017

(54) APPARATUS AND METHOD FOR TREATING ROTATABLE COMPONENT

(71) Applicant: General Electric Company, Schenectady, NY (US)

(72) Inventors: Jason Matthew Clark, Loveland, OH (US); James Bradford Holmes, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 516 days.

(21) Appl. No.: 14/166,043

(22) Filed: Jan. 28, 2014

(65) Prior Publication Data

US 2015/0209929 A1 Jul. 30, 2015

(51) Int. Cl.
| | | |
|---|---|---|
| *B24B 23/08* | (2006.01) | |
| *B24B 5/04* | (2006.01) | |
| *B24B 5/36* | (2006.01) | |
| *B23P 6/04* | (2006.01) | |
| *B24B 23/02* | (2006.01) | |
| *B24B 27/00* | (2006.01) | |
| *B24B 5/35* | (2006.01) | |
| *B24B 19/14* | (2006.01) | |

(Continued)

(52) U.S. Cl.
CPC ...... *B24B 5/36* (2013.01); *B23P 6/04* (2013.01); *B24B 5/04* (2013.01); *B24B 5/35* (2013.01); *B24B 19/14* (2013.01); *B24B 23/028* (2013.01); *B24B 23/08* (2013.01); *B24B 27/0084* (2013.01); *B24B 39/006* (2013.01); *F01D 5/005* (2013.01); *F01D 25/285* (2013.01)

(58) Field of Classification Search
CPC .. B24B 5/04; B24B 5/36; B24B 5/363; B24B 19/14; B24B 23/08; F01D 5/005; F01D 25/285; B23P 6/002; B23P 6/04; B23P 6/045; B23P 15/04; B23Q 9/0014; B23Q 9/0007
See application file for complete search history.

(56) References Cited

U.S. PATENT DOCUMENTS

| | | | | |
|---|---|---|---|---|
| 3,893,372 A | * | 7/1975 | Strakeljahn | ............. B23C 3/126 144/136.95 |
| 4,477,226 A | | 10/1984 | Carreno | |

(Continued)

FOREIGN PATENT DOCUMENTS

| | | |
|---|---|---|
| EP | 1367175 A3 | 11/2004 |
| JP | 5369895 U | 6/1978 |

OTHER PUBLICATIONS

European Search Report and Opinion issued in connection with corresponding EP Application No. 15152565.6 dated Sep. 23, 2015.

*Primary Examiner* — Eileen Morgan

(74) *Attorney, Agent, or Firm* — Ernest G. Cusick; Hoffman Warnick LLC

(57) ABSTRACT

Embodiments of the present disclosure relate generally to an apparatus and method for treating a rotatable component. An apparatus according to the present disclosure can include: a sliding engagement member configured to slidably engage a portion of a rotating component that is temporarily stationary; and a tool engaging member for positioning a machining tool relative to the rotating component to machine a surface of the rotating component, wherein the tool engaging member is rotatable to one of a plurality of angles relative to the sliding engagement member.

18 Claims, 8 Drawing Sheets

(51) Int. Cl.
*B24B 39/00* (2006.01)
*F01D 5/00* (2006.01)
*F01D 25/28* (2006.01)

(56) References Cited

U.S. PATENT DOCUMENTS

| | | | |
|---|---|---|---|
| 4,864,777 A | 9/1989 | McLaughlin et al. | |
| 5,101,557 A * | 4/1992 | Mueller | B23B 47/28 29/889.21 |
| 5,102,221 A | 4/1992 | Desgranges et al. | |
| 5,161,291 A * | 11/1992 | Guenther | B23C 3/00 29/56.5 |
| 5,475,485 A | 12/1995 | Diener | |
| 5,704,826 A | 1/1998 | De Luis Vizcaino | |
| 5,803,680 A | 9/1998 | Diener | |
| 6,899,593 B1 | 5/2005 | Moeller et al. | |
| 7,097,539 B2 | 8/2006 | Moeller et al. | |
| 7,112,118 B1 | 9/2006 | Moeller et al. | |
| 7,118,446 B2 | 10/2006 | Walsh et al. | |
| 7,125,312 B2 | 10/2006 | Castanares et al. | |
| 8,689,441 B2 * | 4/2014 | Guo | B23C 3/30 29/557 |
| 8,813,331 B2 * | 8/2014 | Dimmick, III | F01D 5/005 29/402.01 |
| 9,248,528 B2 * | 2/2016 | Holmes | B23B 41/00 |
| 2010/0162544 A1 | 7/2010 | Sassatelli et al. | |
| 2011/0088921 A1 * | 4/2011 | Forgues | B24B 23/026 173/1 |
| 2012/0251327 A1 * | 10/2012 | Dimmick, III | F01D 5/005 416/219 R |
| 2013/0051947 A1 * | 2/2013 | Holmes | B23B 41/00 408/103 |
| 2013/0205589 A1 * | 8/2013 | Holmes | B23B 41/00 29/889.1 |
| 2014/0341735 A1 * | 11/2014 | Dimmick, III | F01D 5/005 416/95 |

\* cited by examiner

APPARATUS AND METHOD FOR TREATING ROTATABLE COMPONENT

BACKGROUND OF THE INVENTION

Embodiments of the present disclosure relate generally to treating the surface of a rotatable component. More specifically, the present disclosure includes an apparatus and method for treating a rotatable component such as a turbine spacer or a turbine wheel.

In a turbine apparatus such as a steam or gas turbine, various turbine sections typically include substantially circular "spacers" positioned between different turbine wheel stages. Each of these spacers may be coaxial with opposing nozzle diaphragms of the turbine apparatus. Although a turbine apparatus typically includes a set amount of clearance between a spacer and an opposing nozzle diaphragm, some spacers and nozzle diaphragms may contact each other while the turbine operates. Certain types of stress experienced by the turbine spacer can cause "stress risers" to form on the surface of the spacer.

Removing stress risers typically requires an on-site repair to reduce or remove the stress risers from the surface of the spacer. Conventionally, stress risers can be removed by rotating the spacer to a particular position, manually grinding the stress riser with a grinding tool, and then rotating the spacer to reach other stress risers if needed. The manual treatment of stress risers can be a costly and time-consuming process. In addition, human errors during the treatment can create non-uniform turbine spacers or other types of workpieces. In other situations, stress can be intentionally introduced to a spacer or other rotating component by "peening" the surface of the component. Peening can be implemented by similar manually implemented techniques, and therefore may incur similar costs.

BRIEF DESCRIPTION OF THE INVENTION

A first aspect of the present disclosure provides an apparatus. The apparatus can include: a sliding engagement member configured to slidably engage a portion of a rotating component that is temporarily stationary; and a tool engaging member for positioning a machining tool relative to the rotating component to machine a surface of the rotating component, wherein the tool engaging member is rotatable to one of a plurality of angles relative to the sliding engagement member.

A second aspect of the present disclosure provides a method of treating a rotatable turbine component. The method can include: slidably engaging a sliding engagement member of a machining tool to the rotatable turbine component such that an operative head of the machining tool is substantially aligned with a surface of the rotatable turbine component; contacting the surface of the rotatable turbine component with the operative head of the machining tool; and selectively rotating the rotatable turbine component relative to the operative head of the machining tool, wherein the operative head of the tool treats the surface of the rotatable turbine component.

A third aspect of the present disclosure provides an apparatus. The apparatus can include: a sliding engagement member configured to slidably engage a portion of a rotatable turbine component, wherein the sliding engagement member further includes: a projecting section configured to slidably engage a recessed portion of the rotatable turbine component, and a recess configured to slidably engage a projecting portion of the rotatable turbine component; and a tool engaging member for positioning a machining tool relative to the rotatable turbine component to machine a surface of the rotatable turbine component, wherein the tool engaging member is rotatable to one of a plurality of angles relative to the sliding engagement member.

BRIEF DESCRIPTION OF THE DRAWING

These and other features of the disclosed apparatus will be more readily understood from the following detailed description of the various aspects of the apparatus taken in conjunction with the accompanying drawings that depict various embodiments of the invention, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Embodiments of the present disclosure can include an apparatus. The apparatus can include a sliding engagement member which may be designed to slidably engage a portion of a rotatable component. At the time of sliding engagement between a rotating component and the sliding engagement member, the rotating component may be temporarily stationary. The apparatus can also include a tool engaging member coupled to the sliding engagement member, which can be used to position a machining tool relative to a rotating component. The tool engaging member can position the machining tool and allow the machining tool to machine a surface of the rotating component. The tool engaging member can also be rotatable to any one of several angles relative to the sliding engagement member.

Figure 1:
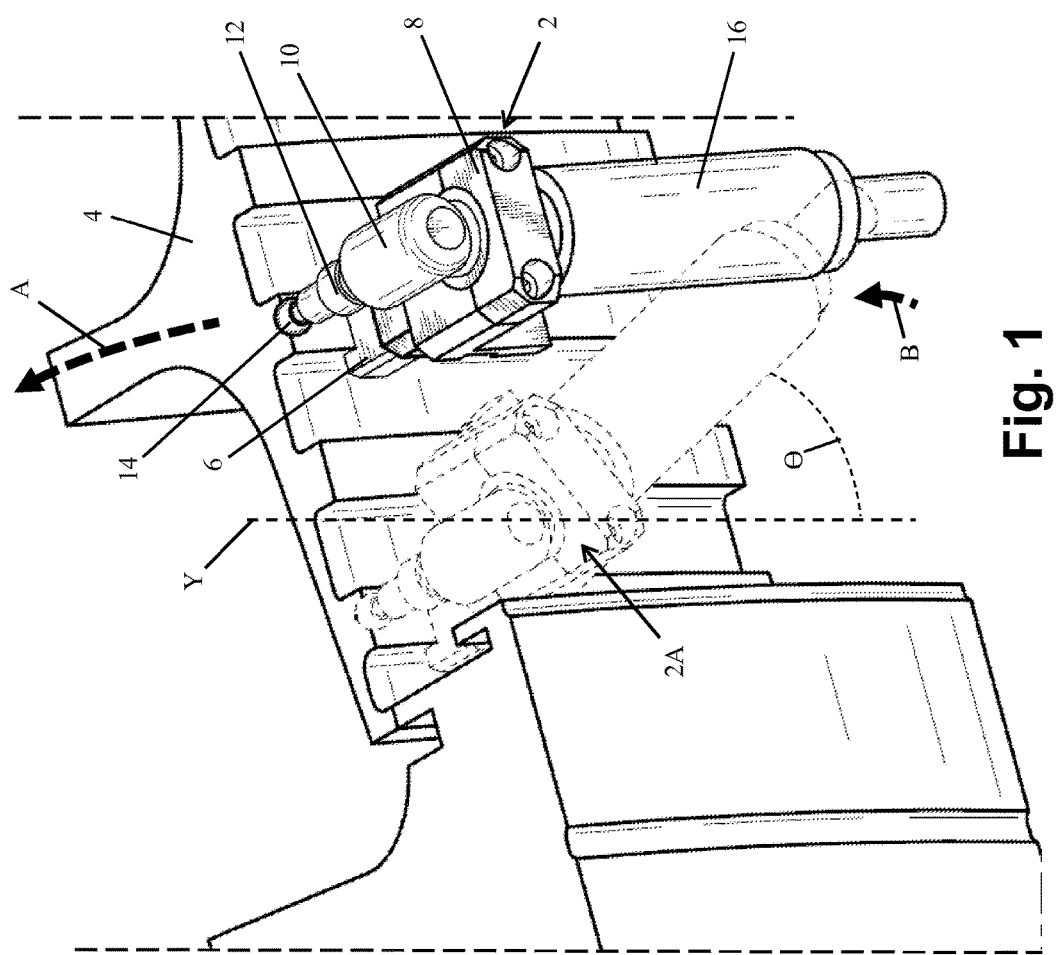
FIG. 1 is a perspective view of an apparatus and rotating component as used in an embodiment of the present disclosure.
Figure 3:
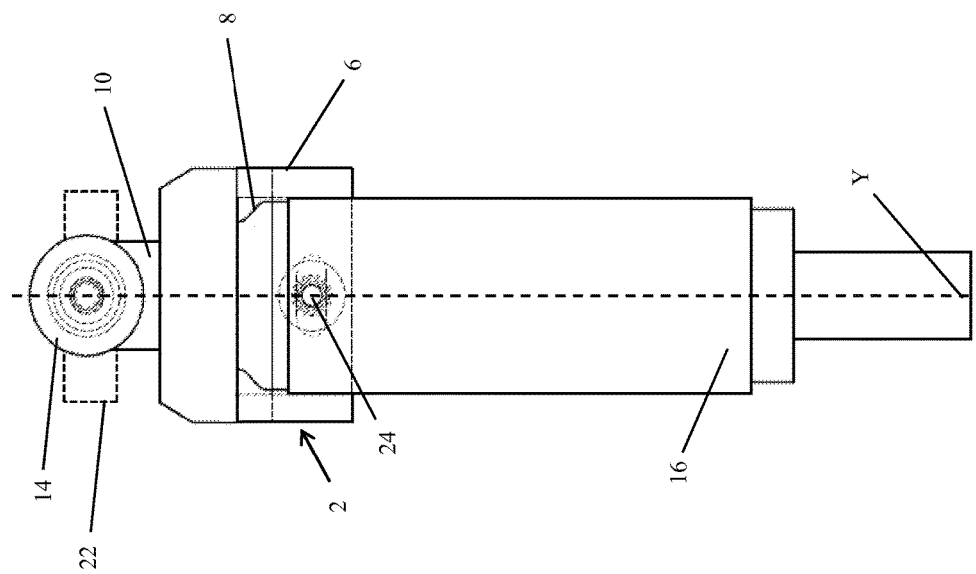
FIG. 3 is a front view of an apparatus according to an embodiment of the present disclosure.

Referring to FIG. 1, an apparatus 2 according to an embodiment of the present disclosure is shown. Apparatus 2 is shown as slidably engaging a rotatable component 4, which can rotate substantially along the path shown by arrows A, B. Apparatus 2 can include a sliding engagement member 6 configured to slidably engage a particular surface of rotatable component 4 while rotatable component 4 is stationary. As shown in FIG. 1, sliding engagement member 6 can include at least one surface dimensioned to contact rotatable component 4. A tool engaging member 8 of apparatus 2 can be rotatably coupled to sliding engagement member 6 by any currently known or later developed form of rotatable coupling. A cross-sectional view of the rotatable coupling (24) between sliding engagement member 6 and tool engaging member 8 is shown in FIG. 3. The rotatable coupling between sliding engagement member 6 and tool engaging member 8 can allow tool engaging member 8 and other components of apparatus 2 to rotate to one or more other positions relative to axis Y. As shown in FIG. 1 by way of example, apparatus 2 is substantially parallel to the direction in which rotatable component 4 rotates, while apparatus 2A (shown in phantom) has been rotated to an angle θ relative to axis Y.

A machining tool 10, with an operative head 12 configured to treat the surface of rotating component 4, can be coupled to tool engaging member 8 of apparatus 2. In embodiments of the present disclosure, a component of operative head 12 such as a grinding stone 14 can contact and machine a portion of rotatable component 4 as rotatable component 4 rotates. In addition, machining tool 10 can include a handle 16 for stabilizing and/or holding apparatus 2 in place while machining tool 10 treats rotatable component 4. Other components of apparatus 2 discussed herein can adjust the slidable engagement between apparatus 2 and rotatable component 4, and can allow apparatus 2 to treat rotatable component 4 according to methods discussed herein.

Figure 2:
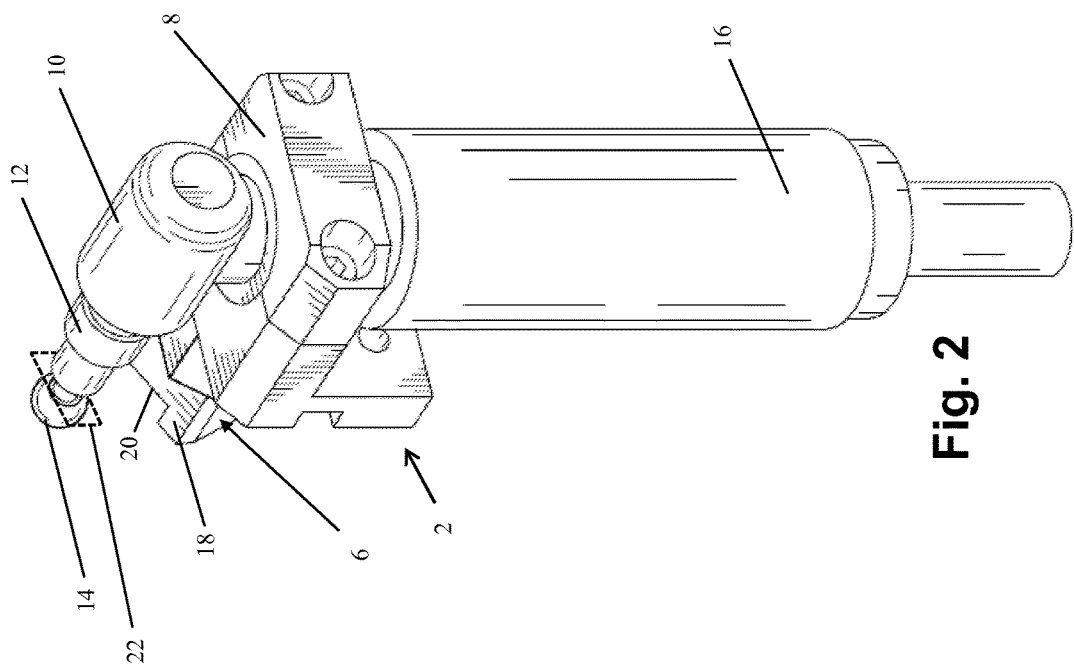
FIG. 2 is a perspective view of an apparatus according to an embodiment of the present disclosure.

Turning to FIG. 2, a perspective view of apparatus 2 according to an embodiment of the present disclosure is shown. Apparatus 2 can include sliding engagement member 6 projecting from apparatus 2. Embodiments of apparatus 2 can machine or otherwise treat rotatable component 4 (FIG. 1), such as a turbine spacer or a turbine wheel, by allowing sliding engagement member 6 to slidably engage rotatable component 4 (FIG. 1). Sliding engagement member 6 can be composed of any currently known or later developed material capable of slidably engaging and moving across the surface of rotatable component 4 (FIG. 1) without treating rotatable component 4 (FIG. 1). For example, sliding engagement member 6 can be composed of a material with a low coefficient of friction with a particular material, and for example can be composed of a thermoplastic, a polymer-based material, or a resinous material. In addition, a portion of sliding engagement member 6 not used for slidably engaging rotatable component 4 (FIG. 1) can be composed of another material, such as a metal. In an embodiment, sliding engagement member 6 can include a projection 18 and a recess 20 configured to slidably engage particular portions of rotatable component 4 (FIG. 1). Projection 18 and recess 20 are described in further detail herein with reference to FIG. 4.

Rotatable component 4 (FIG. 1) can be treated by using operative head 12 of machining tool 10. Machining tool 10 can be coupled to tool engaging member 8 as shown by example in FIGS. 1 and 2. In an embodiment, operative head 12 of machining tool 10 can include a grinding stone 14 configured to grind rotating component 4 (FIG. 1). As sliding engagement member 6 slidably engages rotating component 4, grinding stone 14 can also slidably engage and contact the surface of rotating component 4 (FIG. 1). As rotating component 4 rotates substantially along the direction of arrows A, B (FIG. 1), grinding stone 14 of apparatus 2 can slide across and grind rotatable component 4 to treat surfaces of rotatable component 4. In some implementations, grinding stone 14 can grind stress risers located on the surface of rotating component 4 (FIG. 1) by moving grinding stone 14 and/or using friction between grinding stone 14 and rotating component 4 (FIG. 1). Grinding stone 14 can be moved (e.g., rotated) with an electric motor or equivalent component contained within machining tool 10, e.g., inside of handle 16, as discussed in further detail herein with reference to FIG. 5.

The properties of grinding stone 14 can be customized to achieve different technical purposes. Grinding stone 14 can be composed of any currently known or later developed material capable of machining, grinding, or otherwise treating rotating component 4 (FIG. 1). For example, a turbine wheel or turbine spacer composed of a metal can be treated by a grinding stone composed of, e.g., an abrasive material such as aluminum oxide or silicon carbide. The size of grinding stone 14 can also be customized to suit particular applications. Where grinding stone 14 is substantially spherical, the diameter of grinding stone 14 can be selected to provide particular technical effects. Grinding stones 14 composed of a particular material or configured to have a certain size may provide a particular "aspect ratio" when treating the surface of a rotatable component. As used herein, the term "aspect ratio" can generally refer to a length-to-width ratio, a length-to-depth ratio, or a width-to-depth ratio of a portion of rotating component 4 (FIG. 1). For example, a particular aspect ratio may include width-to-depth where a treated surface forms part of a projecting or recessed portion of rotating component 4 (FIG. 1). By having a predetermined size or material composition, grinding stone 14 can provide a particular aspect ratio to the surface of rotating component 4 (FIG. 1).

In another embodiment, operative head 12 of machining tool 10 can include a flapper 22 (shown in phantom in FIG. 2). Flapper 22 can repeatedly strike and introduce stress to the surface of rotatable component 4 (FIG. 1) by a process known in the art as "peening." For example, flapper 22 can be configured to rotate about a particular axis. Flapper 22 can be actuated by any currently known or later developed means of imparting a mechanical force, such as a motor system positioned within handle 16. Flapper 22, when rotating, can repeatedly strike the surface of rotating component 4 (FIG. 1) to increase the stress of the material being treated. Flapper 22 can be composed of any currently known or later developed material used for flapper peening and capable of increasing a particular material's stress. For example, flapper 22 can be composed of aluminum, copper, steel, or other types of currently known or later developed peening materials.

Machining tool 10 can also include a handle 16 coupled to tool engaging member 8 for holding machining tool 10 in a particular location while treating rotatable component 4 (FIG. 1). A user or a component of another apparatus can grip handle 16 to hold tool engaging member 8 at a particular position relative to the rotation of rotatable component 4 (FIG. 1). For example, a user of apparatus 2 can manually grip handle 16 to hold machining tool 10 in place, thereby allowing part of rotatable component 4 (FIG. 1) to slide within or upon sliding engagement member 6. Further, a user holding apparatus 2 with handle 16 can stabilize machining tool 10 as it contacts and treats the surface of rotatable component 4 (FIG. 1). As an illustrative example, handle 16 can allow apparatus 2 to treat rotatable component 4 (FIG. 1) in a manner similar to the "toolpost" component of a lathe.

Machining tool 10 can include a motor system housed therein (e.g., within handle 16). The motor system of machining tool 10 can convert various types of power (e.g., electricity) into mechanical energy for actuating components coupled to operative head 12 of machining tool 10. For example, the motor system can rotate grinding stone 14 and/or flapper 22 to increase friction between operative head 14 and rotatable component 4. The structure of apparatus 2 can be appropriately sized to house the components of any currently known or later developed motor system (e.g., an electric motor system). In an embodiment, the motor system can be coupled to a rotatable shaft positioned between the motor system and grinding stone 14 or flapper 22. The motor system can rotate the rotatable shaft to move grinding stone 14 or flapper 22.

Turning to FIG. 3, a front view of apparatus 2 is shown. Tool engaging member 8 can be rotatably coupled to sliding engagement member 6 through rotatable coupling 24, which can include any currently known or later developed type of coupling component such as a mechanically rotatable pin or joint. Rotatable coupling 24 can allow tool engaging member 8, machining tool 10, and handle 16 to rotate to any number of rotational positions relative to sliding engagement member 6, oriented in FIG. 3 along axis Y. Further, mechanisms such as locks, latches, stops, and similar structures (not shown) can selectively prohibit rotatable coupling 24 from rotating away from a desired rotational position. Rotatable coupling 24 can allow apparatus 2 to be oriented in a plurality of rotational orientations as shown in FIG. 1, where apparatus 2A (FIG. 1) is shown to have a different rotational position θ relative to axis Y. In alternative embodiments, a motor or pneumatic coupling located within machining tool 10 can actuate rotatable coupling 24. Through rotatable coupling 24, a user can customize the orientation and position of apparatus 2 while treating the surface of rotatable component 4 (FIG. 1)

Figure 4:
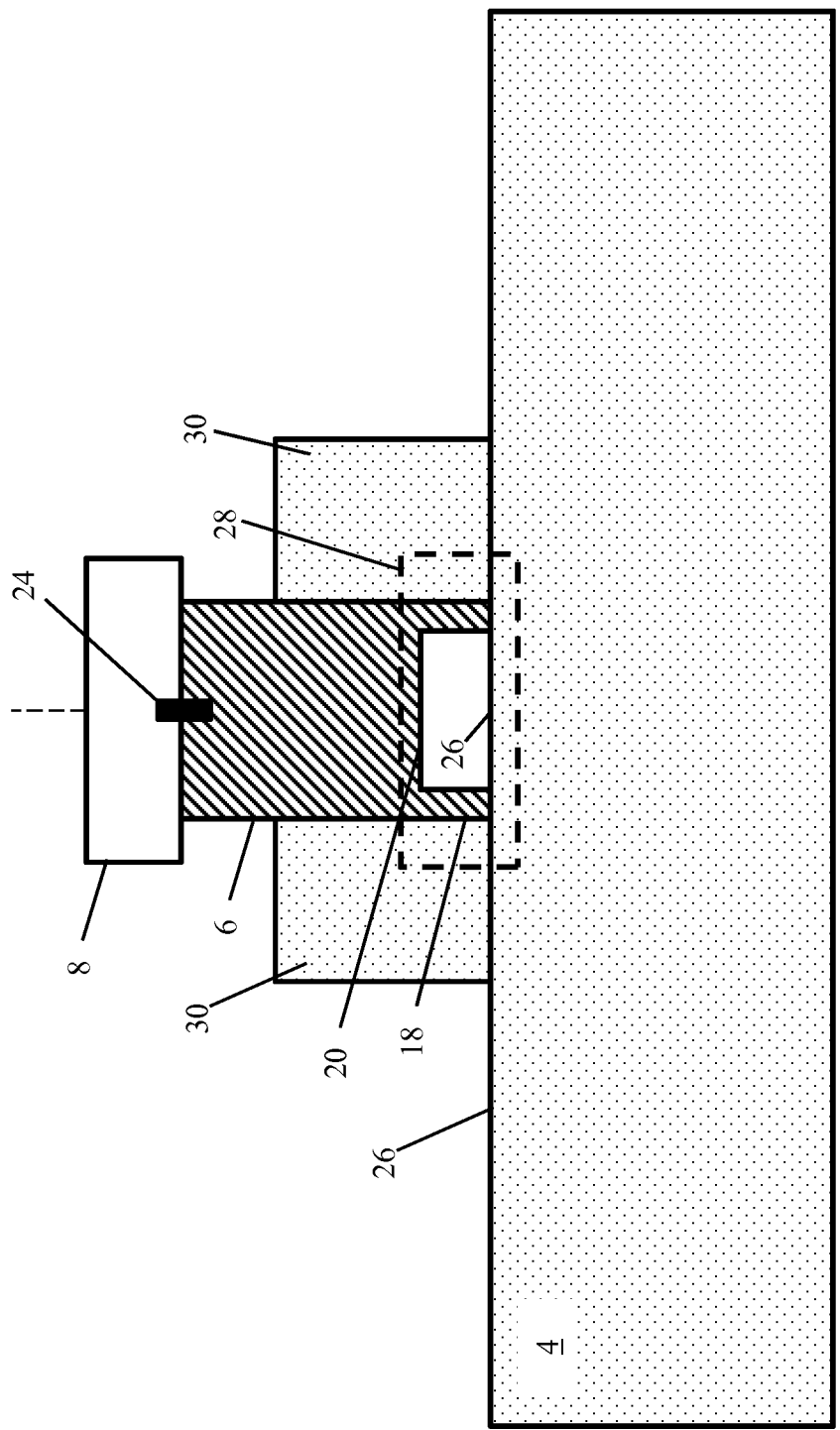
FIGS. 4-5 each depict a cross-sectional view of a slidable engagement between an apparatus of the present disclosure and a rotatable component.

Turning to FIG. 4, embodiments of sliding engagement member 6 can include projection 18 for slidably engaging rotatable component 4. Other components coupled to apparatus 2 are omitted from FIG. 4 for clarity, but can be coupled to tool engaging member 8 at approximately the position of the phantom lines leading thereto. As shown in FIG. 4, projection 18 can slidably engage a recessed portion 26 of rotating component 4. A contact area 28 between rotatable component 4 and recessed portion 26 includes projection 18 of sliding engagement member 6 slidably engaging recessed portion 26 between two projecting portions 30 of rotatable component 4.

Figure 5:
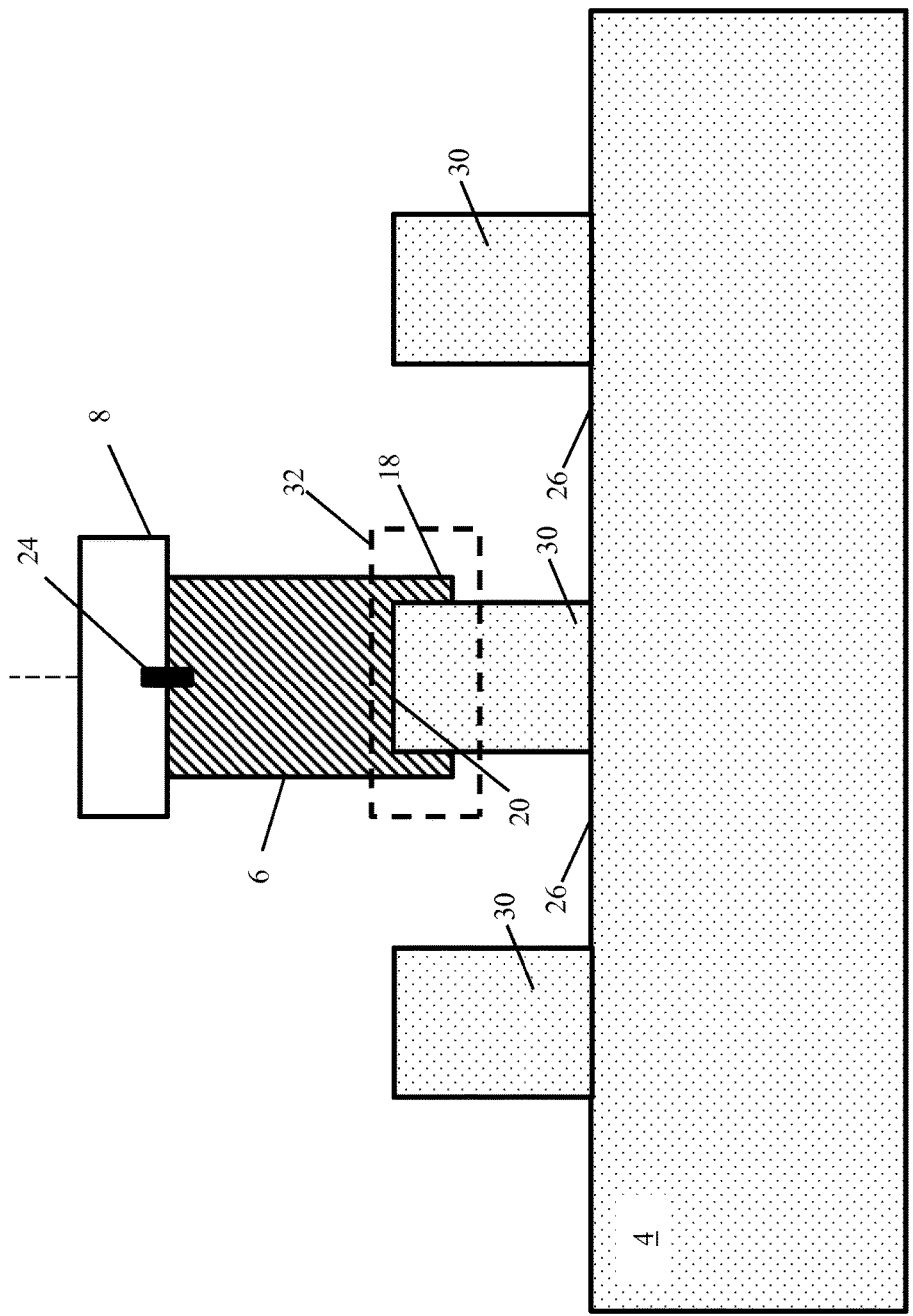

Turning to FIG. 5, recess 20 can provide slidable engagement between apparatus 2 and rotatable component 4. Contact area 32 demonstrates by example that recess 20 can slidably engage a projecting portion 30 of rotatable component 4. Thus, projection 18 and recess 20 can provide more stable and versatile forms of sliding engagement between apparatus 2 and rotatable component 4 by increasing the size of the contact area with sliding engagement member 6. These forms of contact between apparatus 2 and rotatable component 4, through projection 18 or recess 20, can defend apparatus 2 (and machining tool 10) against vibrations and external forces as rotatable component 4 is treated. It is understood that embodiments of apparatus 2 can include one or more projections 18 in conjunction with one or more recesses 20, or that the shape of projection 18 and/or recess 20 can vary between embodiments to accommodate different rotatable components 4.

Figure 6:
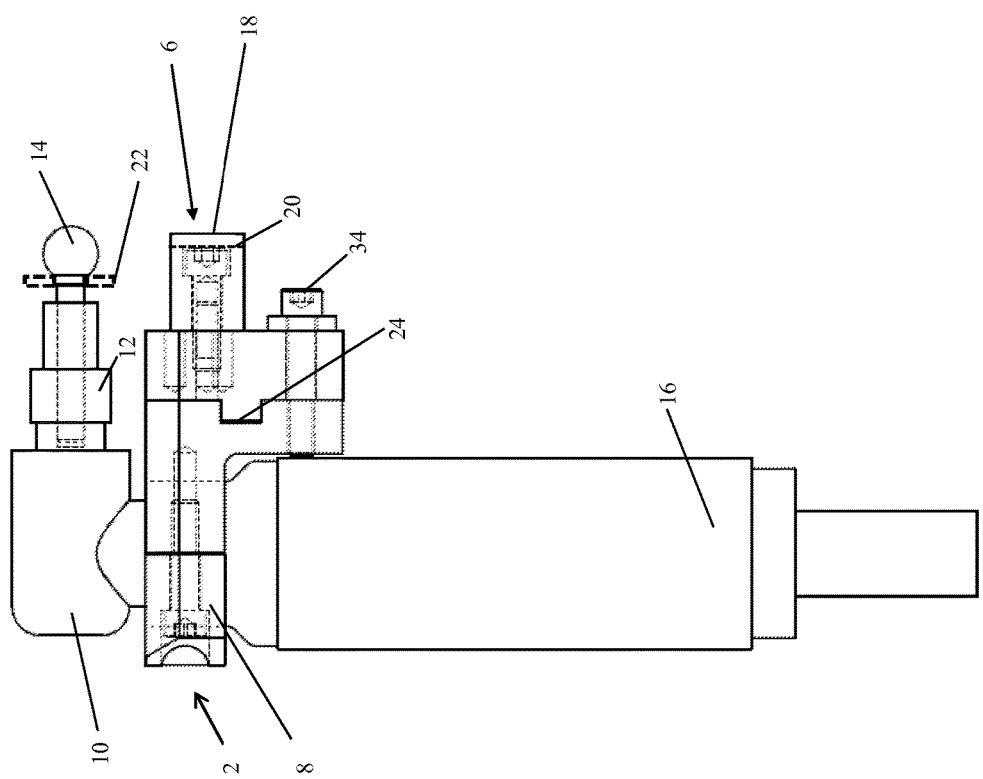
FIG. 6 is a side view of an apparatus according to an embodiment of the present disclosure.

Turning to FIG. 6, apparatus 2 can also include a supplemental fixture 34 coupled to sliding engagement member 6. Supplemental fixture 34 can project either a greater distance or a lesser distance from tool engaging member 8 than sliding engagement member 6. FIG. 6 shows supplemental fixture 34 as extending a lesser distance from tool engaging member 8 for the purposes of illustration. Supplemental fixture 34 can allow apparatus 2 to contact other portions of rotatable component 4 for increased stability. An example of how supplemental fixture 34 contacts a radially distal portion of rotatable component 4 is discussed herein with reference to FIG. 8. Supplemental fixture 34 can be composed of substantially the same materials as in sliding engagement member 6, such as a resinous material or other material with a low coefficient of friction with the material composition of a rotatable component. It is further understood that supplemental fixture 34 can be a modular, removable component which can be exchanged with other supplemental fixtures 34 of varying lengths, in order to accommodate different types of rotatable components 4 (FIGS. 1, 4, 5). As an example, some rotatable components may include alternating projecting and recessed surfaces, and supplemental fixture 34 can stabilize apparatus 2 by contacting a surface of rotating component 4 (FIGS. 1, 4, 5) that is distinct from the surface being treated.

Figure 7:
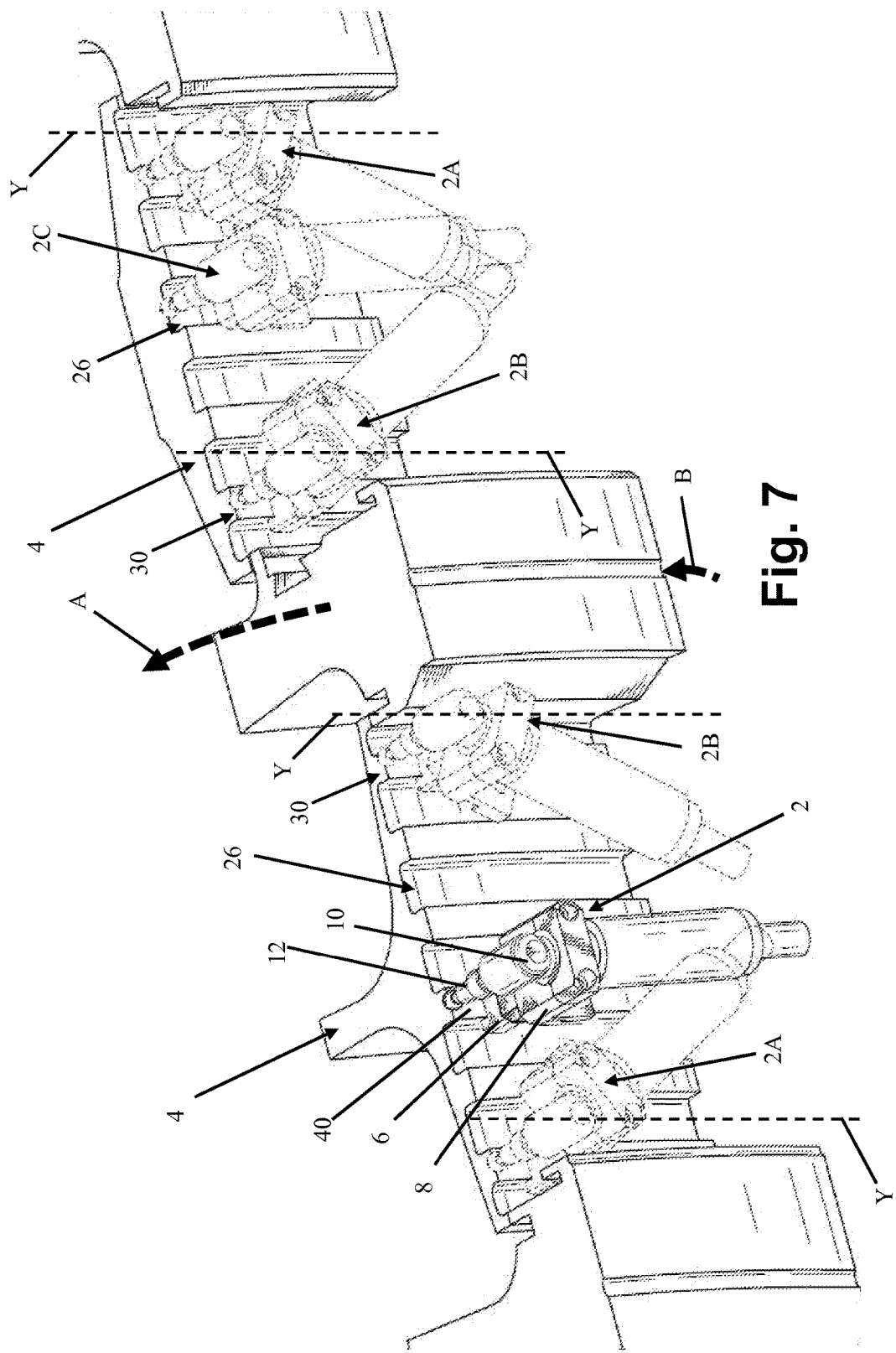
FIG. 7 is a perspective view of an apparatus being used in a method according to an embodiment of the present disclosure.
Figure 8:
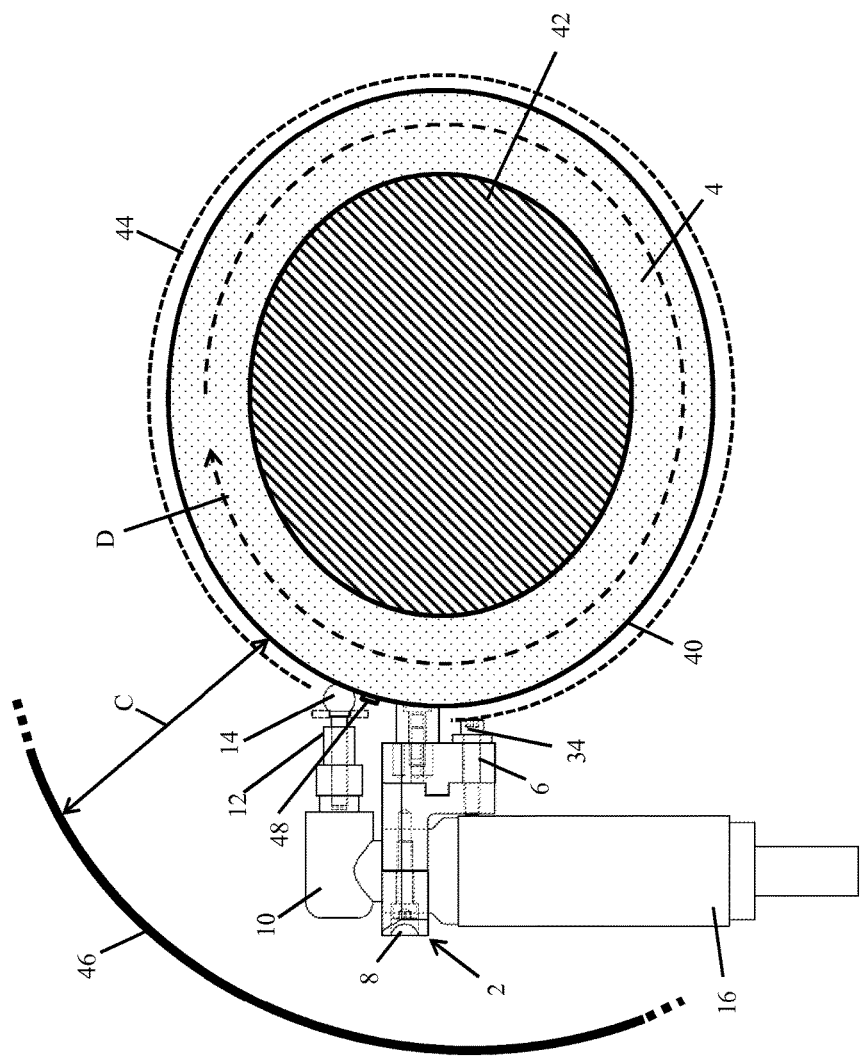
FIG. 8 is a cross-sectional side view of a rotatable component with an apparatus being used in a method according to an embodiment of the present disclosure.

Turning to FIGS. 7-8, a method of treating a rotatable component, such as a rotatable turbine component, is also illustrated. Methods of the present disclosure can include slidably engaging a rotatable component 4 with apparatus 2 to treat a surface 40 of rotatable component 4. Rotatable component 4 is shown by example in FIGS. 7-8 as being a rotatable turbine component (e.g., a turbine spacer or a turbine wheel). It is understood that rotatable component 4 can also be any other rotatable piece of machinery capable of being mechanically treated by processes such as grinding and peening. Rotatable component 4 can rotate substantially along the direction of arrows A and B (shown in phantom) in FIGS. 1 and 7, and along the direction of arrow D (shown in phantom) in FIG. 8. Rotatable component 4 can rotate with the aid of a rotor 42. Embodiments of the method can include slidably engaging sliding engagement member 6 of apparatus 2 to rotatable component 4. Sliding engagement member 6, as discussed elsewhere herein, can be coupled to machining tool 10 through tool engaging member 8. Machining tool 10 can thus become substantially aligned with surface 40 of rotatable component 4 after sliding engagement member 6 slidably engages rotatable component 4. As used herein, the terms "substantial alignment" or "substantially aligned" and their equivalents as used in the present disclosure refer to any alignment through which machining tool 10 and/or operative head 12 can contact rotatable component 4.

Embodiments of the methods described herein can also include contacting surface 40 of rotatable component 4 using operative head 12 of machining tool 10. Operative head 12 can contact surface 40 after sliding engagement member 6 slidably engages rotatable component 4. Operative head 12 can be brought into contact with rotatable component 4 by slidably engaging rotatable component 4 with sliding engagement member 6. For example, where operative head 12 and sliding engagement member 6 both extend approximately the same length from apparatus 2, operative head 12 can contact rotatable component 4 simultaneously with sliding engagement member 6 contacting rotatable component 4. In addition, a user can move operative head 12 of apparatus 2 relative to rotatable component 4 with supplemental components (not shown) within apparatus 2, such as a linear actuator, an extendable or rotatable member, etc. if desired. As shown in FIG. 8, supplemental fixture 34 can contact a radially distal surface 44 (shown in phantom) relative to the surface being treated by machining tool 10, e.g., to increase stability when tool engaging member 8 has rotated relative to sliding engagement member 6. The contact between operative head 12 and surface 40 can provide a particular type of surface treatment as a user selectively rotates rotatable component 4 relative to operative head 12 of machining tool 10. As an example, where operative head 12 includes grinding stone 14, grinding stone 14 can treat surface 40 by sliding across and grinding the surface of rotatable component 4 as described herein. Where operative head 12 includes flapper 14, operative head 12 can strike surface 40 by being rotated or actuated, causing flapper 14 to repeatedly contact surface 40 of rotating component 4.

Turning specifically to FIG. 7, methods of the present disclosure can also include rotating tool engaging member 8 and operative head 12 relative to sliding engagement member 6. Rotatable coupling 24 (FIG. 3) between sliding engagement member 6 and tool engaging member 8, discussed in detail elsewhere herein with respect to FIG. 3, can permit apparatus 2 to rotate to several different positions relative to axis Y. Apparatus 2A and apparatus 2B represent two alternative rotational positions of apparatus 2 relative to axis Y. The different rotational positions shown herein (e.g., apparatus 2A and apparatus 2B) can allow operative head 12 to machine particular surfaces 40 of rotating component 4 without apparatus 2 contacting other components radially distal to rotatable component 4. In addition, adjusting the rotational position of apparatus 2 can allow the electrical coupling between a motor system and operative head 14 to remain the same position.

In addition, sliding engagement member 6 can contact and engage different surfaces of rotatable component 4. For example, rotatable component 4 may include recessed portion 26 and projecting portion 30. Particular components of apparatus 2, such as projection 18, may be configured to engage recessed portion 26. Similarly, other components or features such as recess 20 of apparatus 2 can engage projecting portion 30. Thus, embodiments of apparatus 2 can slidably engage different recessed and projecting portions 26, 30 as needed to treat different areas of rotatable component 4. For the purposes of illustration, apparatus 2B of FIG. 7 is shown as slidably engaging projecting portion 30, while apparatus 2C is shown as slidably engaging recessed portion 26.

Turning specifically to FIG. 8, line C represents a zone of clearance between rotating component 4 and a turbine nozzle diaphragm 46. A small zone of clearance C between rotating component 4 and turbine nozzle diaphragm 46 may restrict the ability of apparatus 2 or components thereof to be positioned in a desired location, as suggested in FIG. 8. Rotating tool engaging member 8 and operative head 12 relative to sliding engagement member 6 can allow operational head 12 to contact rotatable component 4 without other components of apparatus 2 being obstructed by turbine nozzle diaphragm 46 or other radially distal components of a larger assembly. To prevent turbine nozzle diaphragm 46 from obstructing handle 16, handle 16 can also rotate relative to sliding engagement member 6 if desired, and can allow apparatus 2 to be affixed to a particular position relative to rotatable component 4. Thus, apparatus 2 can be "affixed" to a particular position by holding (e.g., by hand) handle 16 in place without turbine nozzle diaphragm 46 obstructing the position of apparatus 2.

In methods of the present disclosure, apparatus 2 can grind surface 40 of rotatable component 4. As discussed elsewhere herein, operative head 12 of machining tool 10 can include grinding stone 14. Grinding stone 14 can slidably engage and grind against surface 40 to remove blemishes and defects as rotatable component 4 rotates. As known in the art, a "stress riser" may arise from stresses acting on a component in a particular direction. A stress riser 48 may form on surface 40 after stress is imparted to rotatable component 4 by interference with turbine nozzle diaphragm 46. To avoid inconsistent treatments of rotatable component 4, methods of the present disclosure can include coupling a particular type of grinding stone 14 to apparatus 2 in order to provide a particular aspect ratio to rotatable component 4. As discussed elsewhere herein, adjusting the size and material properties of grinding stone 14 can influence a resulting aspect ratio of rotatable component 4, such as a length-to-width ratio, length-to-height ratio, etc.

In other embodiments, apparatus 2 can peen surface 40 of rotatable component 4. Operative head 12 of machining tool 10 can include flapper 22. Flapper 22 can repeatedly strike surface 40 to introduce a desired amount of material stress. To adjust the level of peening, the method can include adjusting the speed at which flapper 22 strikes rotatable component 4, or changing the material composition of flapper 22. Methods of the present disclosure also include coupling other types of tools to operative head 12 to provide other currently known or later developed treatments.

The various embodiments discussed in this disclosure can offer several technical and commercial advantages. As one example, rotatable components such as turbine wheels and spacers can be treated in situ with a machining tool capable of uniformly treating stress risers and preserving the aspect ratio of a particular component. The apparatuses and methods disclosed herein can allow components to be machined and treated effectively while reducing the risk of further blemishes to a component. The mechanical-based solutions of the present disclosure can allow rotatable components to be treated in a short time and at a lower cost than electronic, computer-based, or system-based approaches to treating the surface of a rotatable component.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A handheld surface treatment apparatus comprising:
a sliding engagement member configured to slidably engage a portion of a rotating workpiece along a circumferential surface thereof, such that the sliding engagement member remains in a fixed position relative to the rotating workpiece, wherein the sliding engagement member extends substantially perpendicular to the circumferential surface of the workpiece along a pivot axis;
a tool engaging member rotatably coupled to the sliding engagement member and configured to rotate about the pivot axis to one of a plurality of pivot angles relative to the sliding engagement member, wherein the tool engaging member extends substantially perpendicular to the sliding engaging member; and
a machining tool coupled to the tool engaging member, wherein the machining tool extends substantially perpendicularly to the tool engaging member, and substantially in parallel with the pivot axis, wherein the machining tool includes an operative head positioned to contact and machine the circumferential surface of the rotating workpiece.

2. The apparatus of claim 1, wherein the machining tool includes a grinding stone configured to contact and slidably engage the circumferential surface of the rotating workpiece.

3. The apparatus of claim 2, wherein the grinding stone is dimensioned to grind the circumferential surface of the rotating workpiece to form an indentation on the circumferential surface of the rotating workpiece.

4. The apparatus of claim 2, wherein the machining tool is configured to treat a stress riser located on the circumferential surface of the rotating workpiece.

5. The apparatus of claim 1, wherein the machining tool includes a flapper configured to peen the circumferential surface of the rotating workpiece.

6. The apparatus of claim 1, wherein the sliding engagement member further includes a projecting section for slidably engaging a recessed portion of the rotating workpiece.

7. The apparatus of claim 1, wherein the sliding engagement member further includes a recess for slidably engaging a projecting portion of the rotating workpiece.

8. The apparatus of claim 1, wherein the sliding engagement member is shaped to slidably engage one of a turbine wheel or a turbine disc spacer.

9. The apparatus of claim 1, further comprising a supplemental fixture coupled to the sliding engagement member, wherein the supplemental fixture projects one of a greater distance and a lesser distance from the tool engaging member than the sliding engagement member, and is configured to slidably engage a radially distal portion of the rotating workpiece.

10. The apparatus of claim 1, wherein the sliding engagement member includes a resinous material, wherein the resinous material directly engages the rotating workpiece.

11. The apparatus of claim 1, further comprising a handle coupled to the tool engaging member, and configured to hold the tool engaging member at a position relative to the rotating workpiece.

12. The apparatus of claim 1, wherein the sliding engagement member further comprises a metal and a low friction coefficient material, wherein the low friction coefficient material directly engages the rotating workpiece.

13. The apparatus of claim 11, wherein the handle further comprises a motor system encased within the handle.

14. The apparatus of claim 1, further comprising a locking mechanism wherein the locking mechanism is configured about the tool engaging member and the sliding engagement member, prohibiting rotation about the pivot axis.

15. The apparatus of claim 9, wherein the supplemental fixture further comprises a low coefficient of friction material.

16. The apparatus of claim 9, wherein the supplemental fixture is a modular component configured to contact and slidably engage the rotating workpiece.

17. A handheld surface treatment apparatus comprising:
a sliding engagement member configured to slidably engage a portion of a rotatable workpiece along a circumferential surface thereof, such that the sliding engagement member remains in a fixed position relative to the rotating workpiece, wherein the sliding engagement member extends substantially perpendicular to the circumferential surface of the workpiece along a pivot axis, wherein the sliding engagement member further includes:
a projecting section configured to slidably engage a recessed portion of the rotatable workpiece, or
a recess configured to slidably engage a projecting portion of the rotatable workpiece; and
a tool engaging member rotatably coupled to the sliding engagement member and configured to rotate about the pivot axis to one of a plurality of pivot angles relative to the sliding engagement member, wherein the tool engaging member extends substantially perpendicularly to the sliding engaging member; and
a machining tool coupled to the tool engaging member, wherein the machining tool extends substantially perpendicularly to the tool engaging member, and substantially in parallel with the pivot axis, wherein the machining tool includes an operative head positioned to contact and machine the circumferential surface of the rotating workpiece.

18. The apparatus of claim 17, further comprising the machining tool coupled to the tool engaging member, wherein the machining tool comprises one of a grinding stone or a flapper configured to treat the surface of the rotatable workpiece.

* * * * *